United States Patent
Su

[11] Patent Number: 5,826,498
[45] Date of Patent: Oct. 27, 1998

[54] STRUCTURE OF AN APPARATUS FOR DEHYDRATING FRUITS, VEGETABLES AND FOODS

[76] Inventor: Johnson Su, P.O. Box 82-144, Taipei, Taiwan

[21] Appl. No.: 986,829

[22] Filed: Dec. 8, 1997

[51] Int. Cl.⁶ .............................. A23B 4/04; F26B 23/06; F26B 25/18
[52] U.S. Cl. ................................ 99/476; 34/196; 34/197; 99/483; 126/21 A; 219/400; 219/386
[58] Field of Search ...................... 99/467, 468, 473–476, 99/483, 330, 339, 516, 417, 446, 450; 34/237, 238, 195–197, 192, 200; 126/200, 21 A, 21 R, 369, 246, 261; 312/236; 219/400, 401, 385–387, 406; 426/520, 521, 523, 509, 510; 21/126, 188

[56] References Cited

U.S. PATENT DOCUMENTS

| | | | |
|---|---|---|---|
| 3,943,842 | 3/1976 | Bills et al. | 99/473 |
| 4,065,857 | 1/1978 | Nelson et al. | 34/197 X |
| 4,190,965 | 3/1980 | Erickson | 34/196 |
| 4,380,127 | 4/1983 | Roberts | 34/197 |
| 4,536,643 | 8/1985 | Erickson | 219/400 |
| 5,215,004 | 6/1993 | Su | 99/483 |
| 5,235,906 | 8/1993 | Hsu | 99/476 X |
| 5,311,673 | 5/1994 | Su | 34/197 |
| 5,379,527 | 1/1995 | Su | 99/483 X |
| 5,420,393 | 5/1995 | Dornbush et al. | 219/400 |
| 5,423,249 | 6/1995 | Meyer | 99/476 X |
| 5,437,108 | 8/1995 | Alseth | 34/196 |
| 5,458,050 | 10/1995 | Su | 99/417 X |

*Primary Examiner*—Timothy F. Simone
*Attorney, Agent, or Firm*—A & J

[57] ABSTRACT

An apparatus for dehydrating fruits, vegetables and foods includes a stand having a recess, a blowing chamber having a top formed with a plurality of perforations, a fan chamber under the blowing chamber and communicated with the blowing chamber, and a tubular member close to a vertical inner wall of the recess, an electric motor fixedly mounted within the recess of the stand, a fan fitted within the fan chamber and drivingly connected with the electric motor, a base having a center hole fitted over the blowing chamber and a tubular portion close to an edge of the base, a plurality of trays each having a tubular portion aligned with the tubular portion of the base, a cover adapted to fit on an uppermost one of the trays and provided with a plurality of holes, an axle extending through the tubular member of the stand and the tubular portions of the trays, and a leg frame telescopically mounted on a bottom of the stand, whereby the trays can be easily turned open or closed as desired.

1 Claim, 8 Drawing Sheets

STRUCTURE OF AN APPARATUS FOR DEHYDRATING FRUITS, VEGETABLES AND FOODS

BACKGROUND OF THE INVENTION

1. Field of the Invention

This invention is related to an improvement in the structure of an apparatus for dehydrating fruits, vegetables and foods.

2. Description of the Prior Art

It has been found that the conventional apparatus for dehydrating fruits, vegetables and foods is provided with a plurality of trays which are stacked up into a pile. Nevertheless, when desired to take one of the trays, it is necessary to remove all of the trays stacked on that tray thereby causing very much inconvenience in operation and making it unfit for practical use. Furthermore, the number of trays cannot be changed as desired, resulting in the lack of flexibility in use.

Therefore, it is an object of the present invention to provide an improvement in the structure of an apparatus for dehydrating fruits, vegetables and foods which can obviate and mitigate the above-mentioned drawbacks.

SUMMARY OF THE INVENTION

This invention is related to an improvement in the structure of an apparatus for dehydrating fruits, vegetable and foods.

It is the primary object of the present invention to provide an improvement in the structure of an apparatus for dehydrating fruits, vegetable and foods, of which the trays can be easily turned open or closed as desired.

It is another object of the present invention to provide an improvement in the structure of an apparatus for dehydrating fruits, vegetable and foods, which can stand firmly on the table by itself.

It is still another object of the present invention to provide an improvement in the structure of an apparatus for dehydrating fruits, vegetable and foods, which is simple in construction.

It is still another object of the present invention to provide an improvement in the structure of an apparatus for dehydrating fruits, vegetable and foods, which is convenient to use.

It is a further object of the present invention to provide an improvement in the structure of an apparatus for dehydrating fruits, vegetable and foods, which is low in manufacturing cost.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
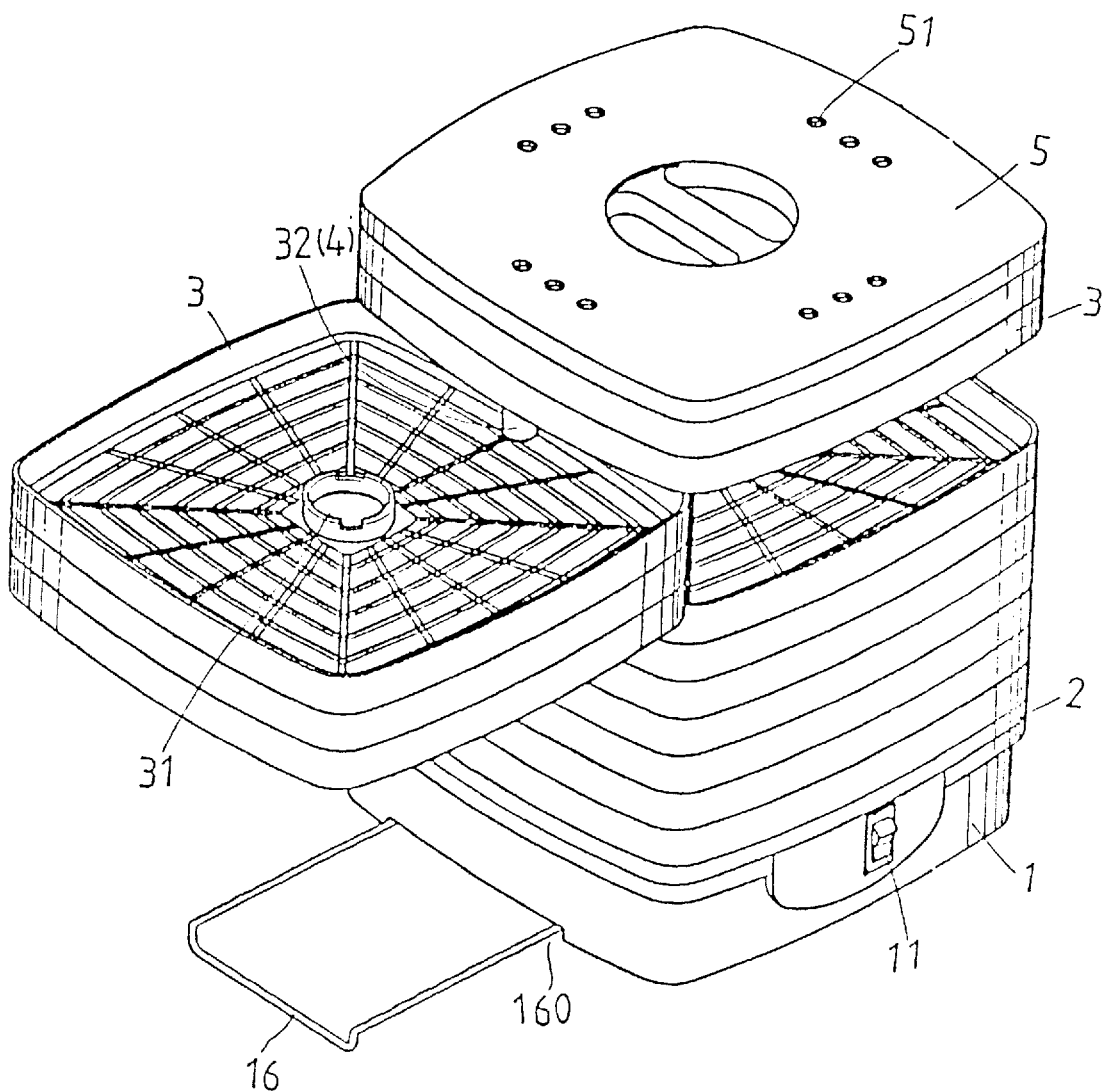
FIG. 1 is a perspective view of an apparatus for dehydrating fruits, vegetables and foods according to the present invention, with one tray shown open.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 1, 2, 3, 4 and 5 thereof, the apparatus for dehydrating fruits, vegetables and foods according to the present invention generally comprises a stand 1, a base 2, a plurality of trays 3, an axle 4, and a cover 5. An electric motor 12 is mounted within the stand 1. A fan 13 is arranged within a fan chamber (shown but not numbered) under the electric motor 12. A blowing chamber 14 is formed at the central portion of the stand 1 and communicated with the fan chamber. The top of the blowing chamber 14 is formed with a plurality of perforations so that when the electric motor 12 is turned on, the fan 13 will blow out air through the blowing chamber 14. A switch 11 is arranged on the outer side of the stand 1 for controlling the electric motor 12 and a heating element (not shown). The stand 1 is provided with a tubular member 15 with internal threads 151 is close to its one vertical side. An opening 160 is formed at the bottom of the stand 1 in which is telescopically fitted a leg frame 16.

The base 2 is mounted on the stand 1 and has a center hole 21 fitted over the blowing chamber 14 of the stand 1 for the passage of the air current generated by the fan 13. The base 2 is formed with a tubular member 22 close to its edge which is fitted in the tubular member 15 of the stand 1.

Figure 2:
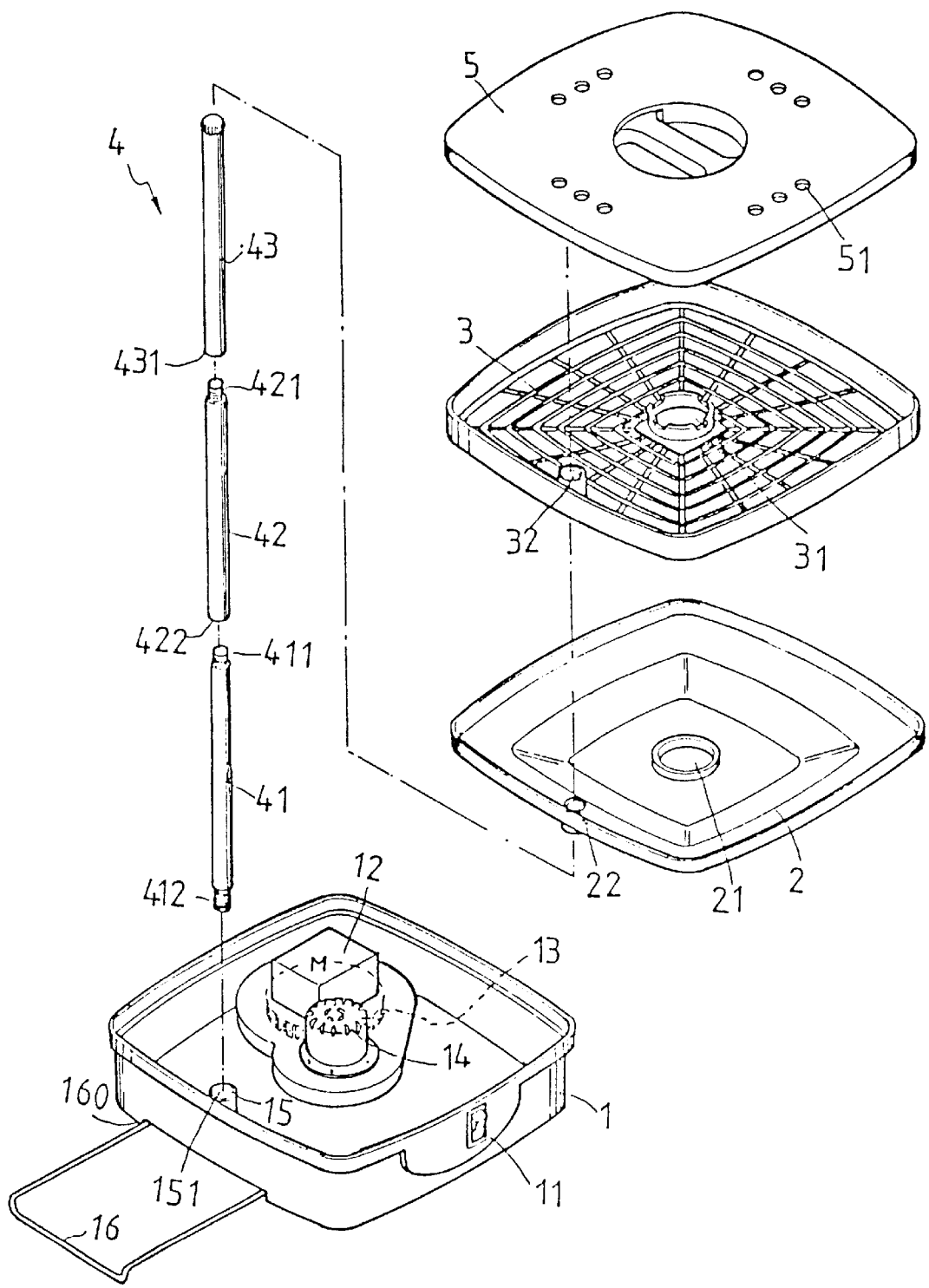
FIG. 2 is an exploded view of the apparatus according to the present invention.
Figure 3:
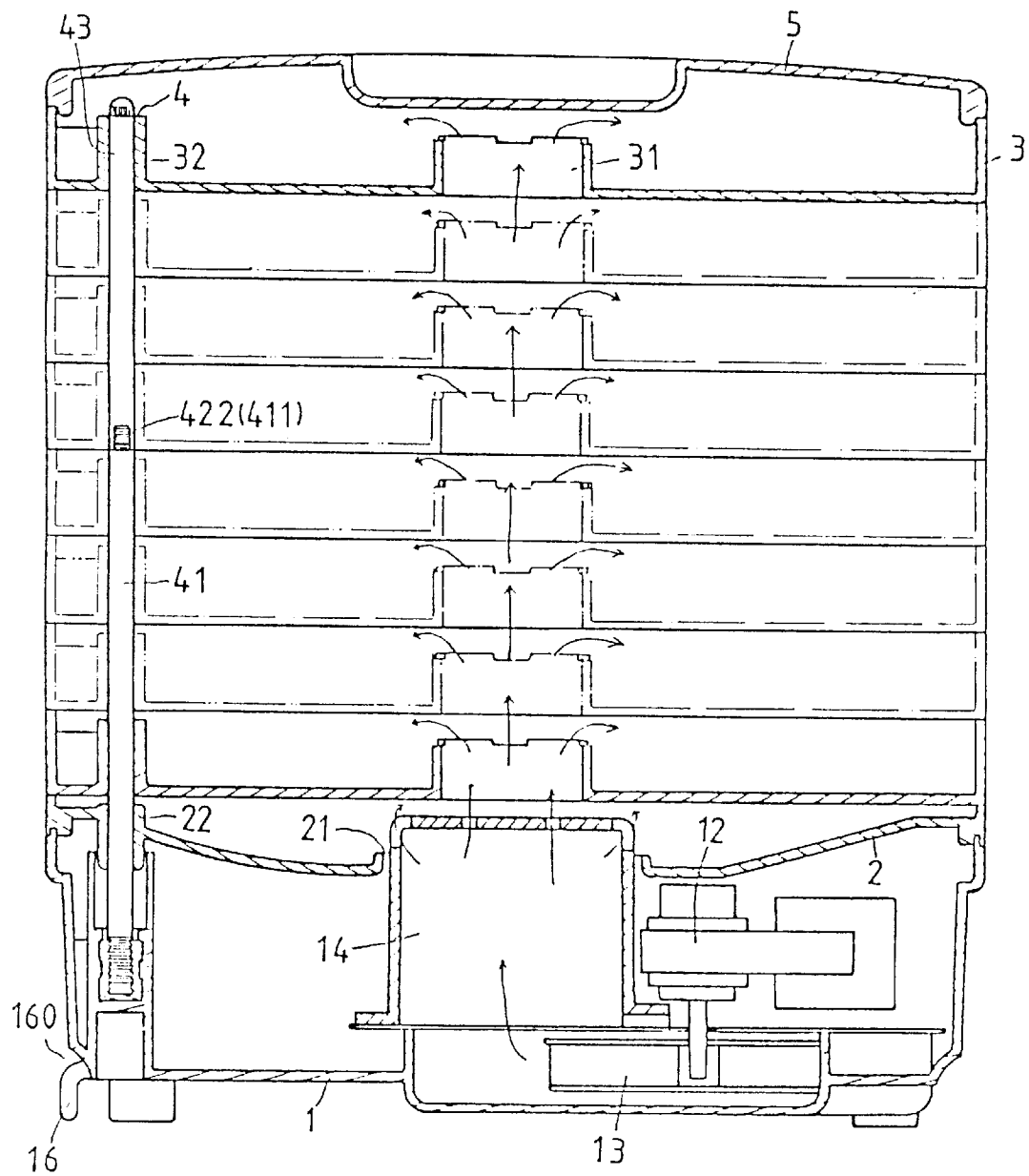
FIG. 3 is a sectional view of the apparatus according to the present invention.
Figure 4:
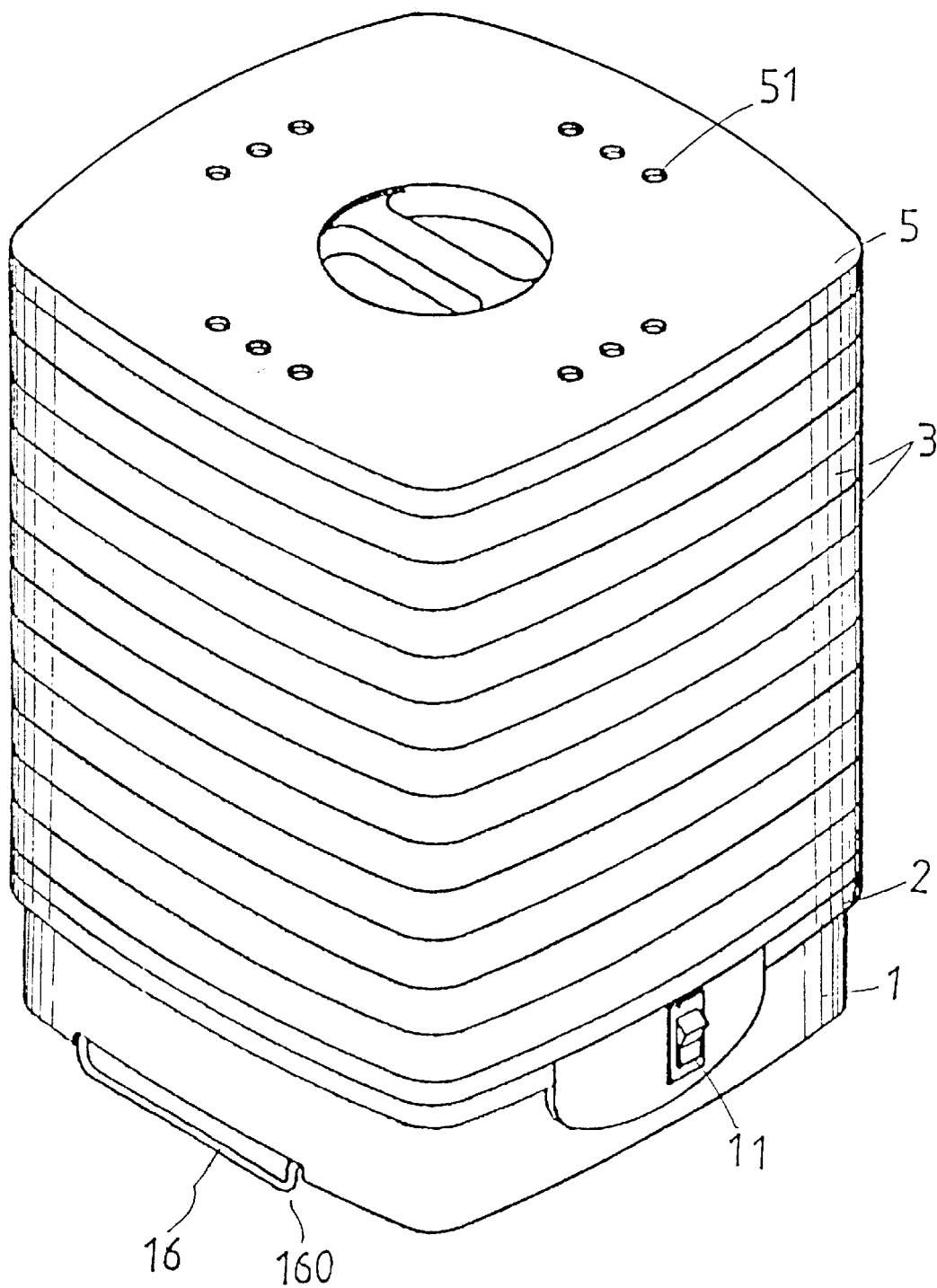
FIG. 4 is a perspective view of the apparatus according to the present invention.
Figure 5:
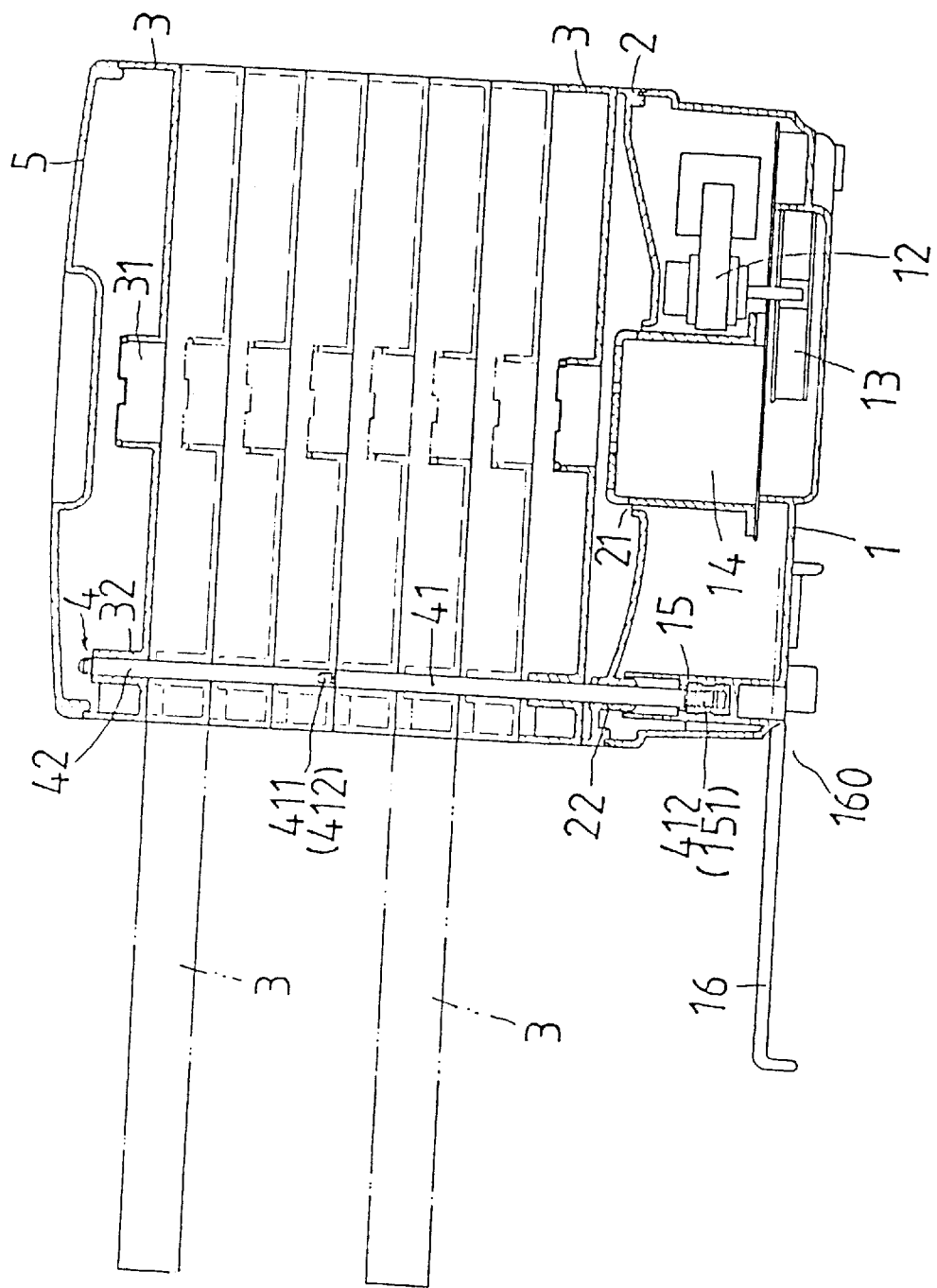
FIG. 5 is a sectional view of the apparatus according to the present invention, with two trays shown open.

The axle 4 includes a lower rod 41, an intermediate rod 42, and an upper rod 43. The lower rod 41 is formed with external threads 411 at the top end and external threads 412 at the bottom end. The intermediate rod 42 is formed with external threads 421 at the top and internal threads 422 at the bottom end and the bottom end of the intermediate rod 42 is connected with the upper end of the lower rod 41. The upper rod 43 is formed with internal threads 431 at the bottom end and the bottom end of the upper end 43 is engaged with the top of the intermediate rod 42. The lower rod 41 is vertically inserted through the tubular member 22 of the base 2 to threadedly engage with the internal threads 151 of the tubular member 15 of the stand 1. A plurality of trays 3 (only one is shown in FIG. 2) each having a center hole 31 and a tubular portion 32 close to its edge are mounted on the base 2 so that the center holes 31 of the trays 3 are aligned with the hole 21 of the base 2 and the blowing chamber 14 of the stand 1 and the axle 4 goes through the tubular portions 32 of the trays 3 thereby enabling the trays 3 to rotate with respect to the axle 4. The cover 5 formed with a plurality of holes 51 is arranged on the upper tray 3.

As shown in FIG. 1, the trays 3 may be turned out of the stand 1 with respect to the axle 4 and the leg frame 16 may be pulled out of the stand 1 to further support the stability of the present invention so that even when the trays 3 are turned out of the stand 1, the present invention can still stand firmly on the table or the like.

Figure 6:
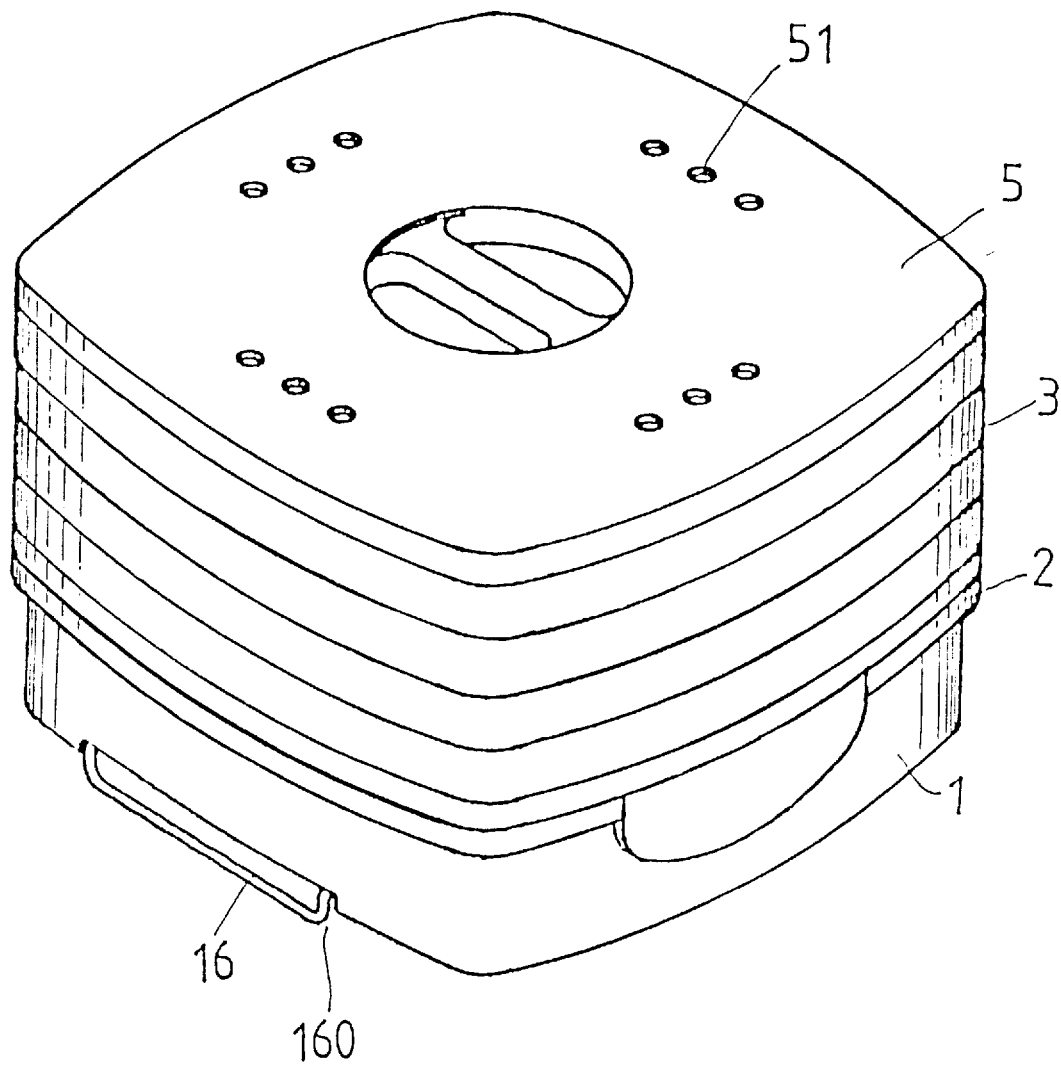
FIG. 6 illustrates a second preferred embodiment of the present invention.
Figure 7:
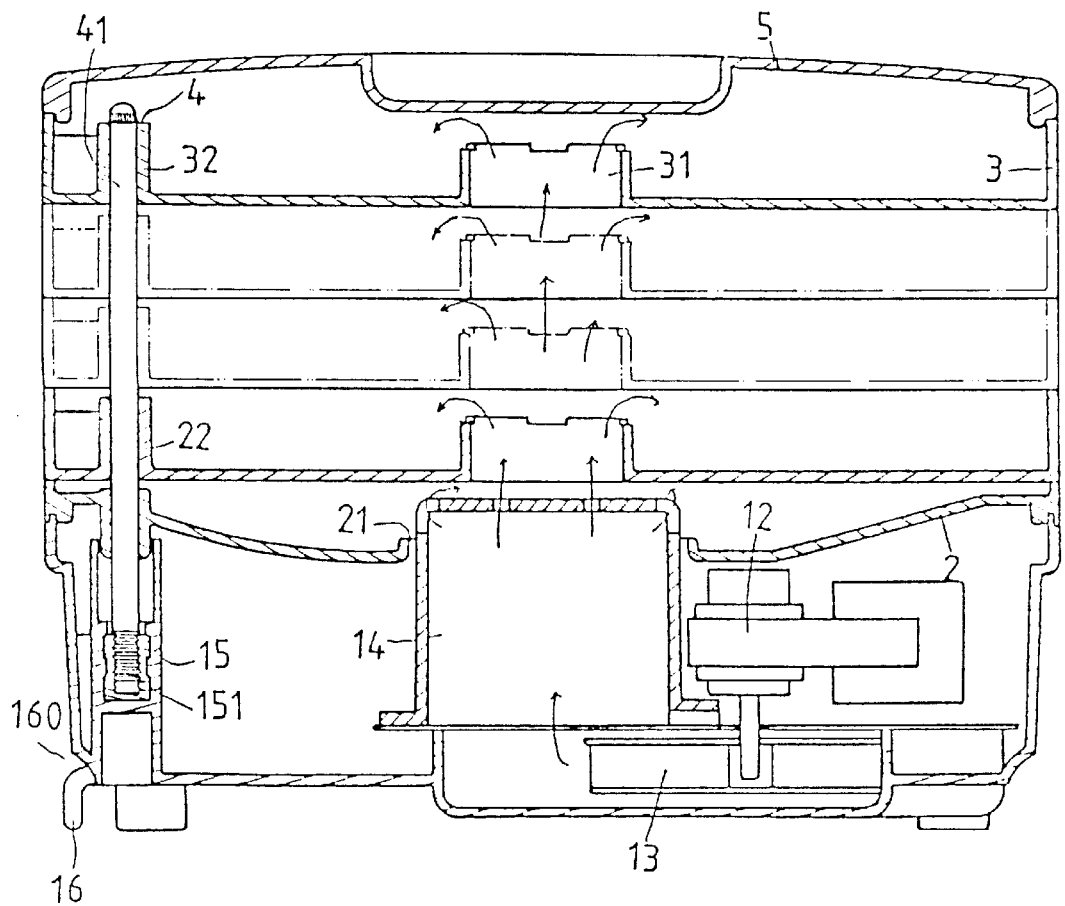
FIG. 7 is a sectional view of FIG. 6.
Figure 8:
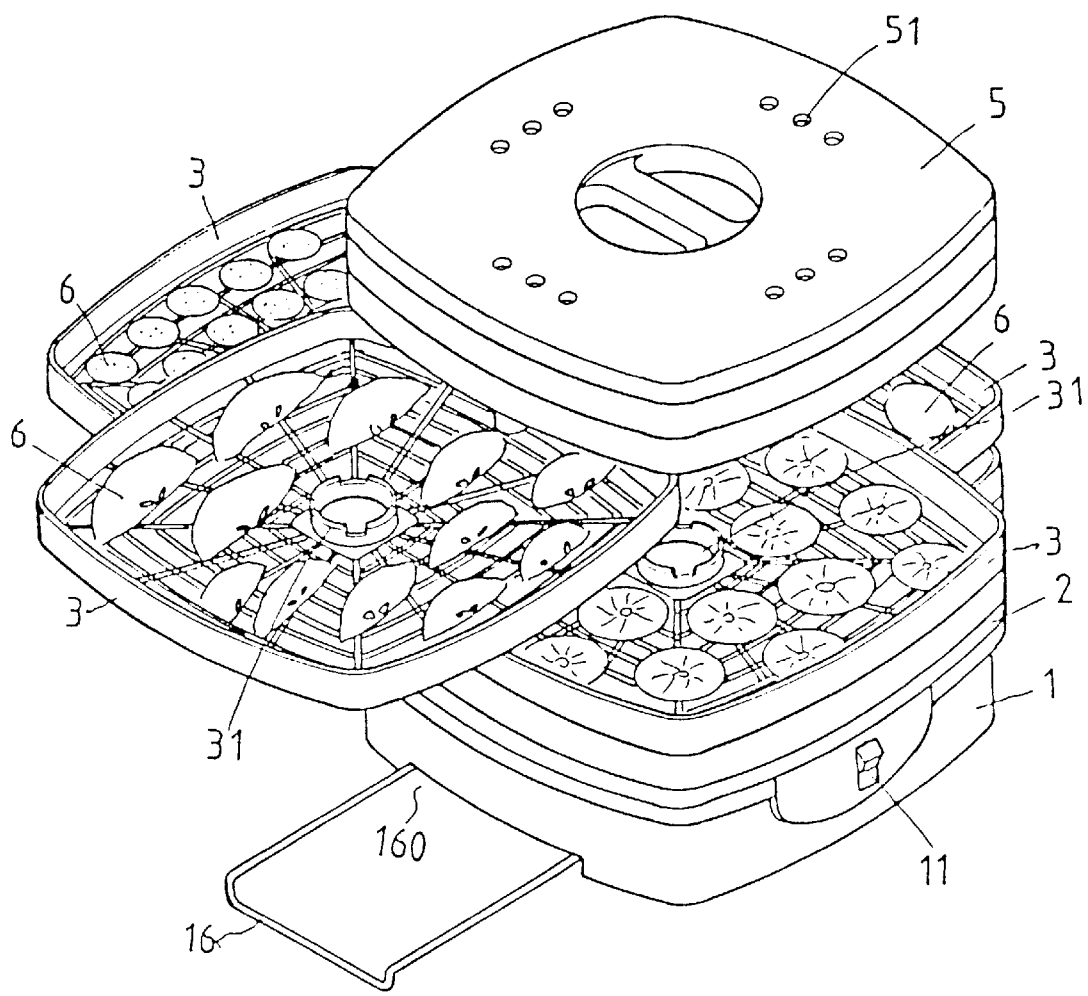
FIG. 8 is a perspective view of the second preferred embodiment of the present invention.

FIGS. 6, 7 and 8 illustrate a second preferred embodiment of the present invention. As shown, the number of trays 3 is reduced in the second preferred embodiment and only the lower rod 41 is used. The top end of the lower rod 41 is engaged with a nut (not shown). When desired to increase the number of trays 3, it is only necessary to engage the intermediate rod 42 with the lower rod 41 and the upper rod 43 with the intermediate rod 42 and put additional trays 3 on the rods.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An apparatus for dehydrating fruits, vegetables and foods comprising:

a stand having a recess, a blowing chamber having a top formed with a plurality of perforations, a fan chamber under said blowing chamber and communicated with said blowing chamber, and a tubular member close to a vertical inner wall of said recess;

an electric motor fixedly mounted within said recess of said stand;

a fan fitted within said fan chamber and drivingly connected with said electric motor;

a base having a center hole fitted over said blowing chamber and a tubular portion close to an edge of said base;

a plurality of trays each having a tubular portion aligned with said tubular portion of said base;

a cover adapted to fit on an uppermost one of said trays and provided with a plurality of holes;

an axle extending through said tubular member of said stand and said tubular portion of said trays and including a lower rod, an intermediate rod, and an upper rod, said lower rod having an externally threaded upper end and an internally threaded lower end engaged with said tubular member of said stand, said intermediate rod having an externally threaded upper end and an internally threaded lower end engaged with said externally threaded upper end of said lower rod, said upper rod having an internally threaded end engaged with said externally threaded upper end of said intermediate rod; and a leg frame telescopically mounted on a bottom of said stand.

* * * * *